United States Patent [19]
Schnaibel et al.

[11] Patent Number: 5,647,669
[45] Date of Patent: Jul. 15, 1997

[54] METHOD FOR GENERATING A SIMULATED SIGNAL RELATING TO A TEMPERATURE IN THE EXHAUST SYSTEM OF AN INTERNAL COMBUSTION ENGINE

[75] Inventors: Eberhard Schnaibel, Hemmingen; Erich Junginger, Stuttgart; Erich Schneider, Kirchheim, all of Germany

[73] Assignee: Robert Bosch GmbH, Stuttgart, Germany

[21] Appl. No.: 477,037

[22] Filed: Jun. 7, 1995

[30] Foreign Application Priority Data

Jul. 14, 1994 [DE] Germany ............... 44 24 811.3

[51] Int. Cl.⁶ ........................................ G01K 13/02
[52] U.S. Cl. .................. 374/144; 123/198 D; 364/557; 364/581
[58] Field of Search ............... 374/144; 123/198 D; 364/581, 557

[56] References Cited

U.S. PATENT DOCUMENTS

| | | | |
|---|---|---|---|
| 3,990,308 | 11/1976 | McCormick et al. | 374/144 |
| 4,178,798 | 12/1979 | Wessel | 374/144 |
| 4,442,424 | 4/1984 | Shirasaki et al. | 374/144 |
| 5,255,511 | 10/1993 | Maus et al. | 374/144 |

FOREIGN PATENT DOCUMENTS

| | | | |
|---|---|---|---|
| 970593 | 7/1975 | Canada | 374/144 |
| 0 492 324 | 7/1992 | European Pat. Off. | |
| 963037 | 6/1950 | France | 374/144 |
| 2277235 | 1/1976 | France | 374/144 |
| 25 10 988 | 1/1976 | Germany. | |
| 41 21 396 | 1/1993 | Germany. | |
| 43 38 342 | 5/1995 | Germany. | |
| 1273749 | 11/1986 | U.S.S.R. | |

*Primary Examiner*—Diego F. F. Gutierrez
*Attorney, Agent, or Firm*—Kenyon & Kenyon

[57] ABSTRACT

A method and device for generating a simulated signal relating to a temperature in the exhaust system of a motor vehicle. By means of a characteristic curve or a characteristic diagram, a signal for a steady state exhaust gas temperature is generated as a function of the flow rate of gas through the internal combustion engine of the motor vehicle. This signal is further processed to generate a signal for a rapid portion and to form a signal for a slow portion of the exhaust gas temperature. The signals for the two portions are superimposed with a prescribable weighting to generate a signal for the exhaust gas temperature. The signal for the slow portion can be logically connected, before the superimposition, to a correction value which depends on the speed of the vehicle.

11 Claims, 3 Drawing Sheets

METHOD FOR GENERATING A SIMULATED SIGNAL RELATING TO A TEMPERATURE IN THE EXHAUST SYSTEM OF AN INTERNAL COMBUSTION ENGINE

FIELD OF THE INVENTION

The present invention relates to a method and device for forming a simulated signal relating to a temperature in the exhaust system of a motor vehicle.

BACKGROUND INFORMATION

The non-prepublished German Patent Application No. DE 43 38 342 describes a method and a device for forming a simulated signal relating to the temperature of the exhaust gas of the exhaust gas sensor, or of the catalytic converter. In the known method, there is provision for a steady state exhaust gas temperature to be determined with a characteristic curve. Using a first filter, the variation over time of the exhaust gas temperature upstream of the catalytic converter is simulated on the basis of the steady state exhaust gas temperature. Using a second filter, the temperature of the catalytic converter also can be determined.

SUMMARY OF THE INVENTION

The present invention differs from the known method in the fact that during the simulation of the variation over time of the exhaust gas temperature on the basis of the steady state exhaust gas temperature, a division takes place into a rapid portion and a slow portion which are further processed separately, and subsequently superimposed again. In addition, according to the present invention, cooling of the exhaust gases as a function of the travelling speed is provided as an additional influencing factor.

The method according to the present invention has the advantage that the variation over time of a temperature in the exhaust gas system of a motor vehicle can be simulated very precisely without an exhaust gas temperature sensor being required. This is achieved in particular in that, on the basis of a signal for a steady state exhaust gas temperature, which signal is determined using a characteristic curve or a characteristic diagram, a signal is formed (generated) for a slow portion and a signal is formed for a rapid portion of the exhaust gas temperature. These two signals are superimposed to form (generate) one signal which indicates the exhaust gas temperature very precisely, even under non steady-state operating conditions.

It is particularly advantageous that the signal for the rapid portion and the signal for the slow portion can be logically connected, before the superimposition, to prescribable weighting factors. As a result, allowance can be made for the differing degrees of influence of the two portions on the exhaust gas temperature. Since this influence depends on the flow rate of gas through the internal combustion engine, it is advantageous to prescribe the weighting factors as a function of the flow rate of gas through the internal combustion engine.

In another embodiment of the present invention, the cooling effect of the slipstream on the exhaust gas system also is taken into account in that the signal for the slow portion can be influenced by a correction factor which can be prescribed as a function of the speed of the vehicle.

The signal for the rapid portion and the signal for the slow portion can be determined without a large degree of outlay by filtering the signal for the steady-state exhaust gas temperature. Here, a filter with a lesser filtering effect than the one used to determine the signal for the slow portion is used to determine the signal for the rapid portion. A particularly high degree of precision can be achieved, in that the filtering effect can be prescribed as a function of the flow rate of gas through the internal combustion engine.

The flow rate of gas through the internal combustion engine can be indicated, depending on the sensors available or the signals already preprocessed, by a signal for the airflow rate or by signals for the load and the speed of revolution or similar signals.

According to the present invention, the filters are implemented as lowpass filters, a lowpass filter which has a smaller timing constant than the one used to determine the signal for the slow portion being used to determine the signal for the rapid portion.

From the signal for the exhaust gas temperature, at least one signal for a further temperature in the exhaust system of the internal combustion engine can be determined, for example the temperature of a catalytic converter or the temperature of an exhaust gas sensor upstream or downstream of the catalytic converter etc.

DETAILED DESCRIPTION OF THE INVENTION

Figure 1:
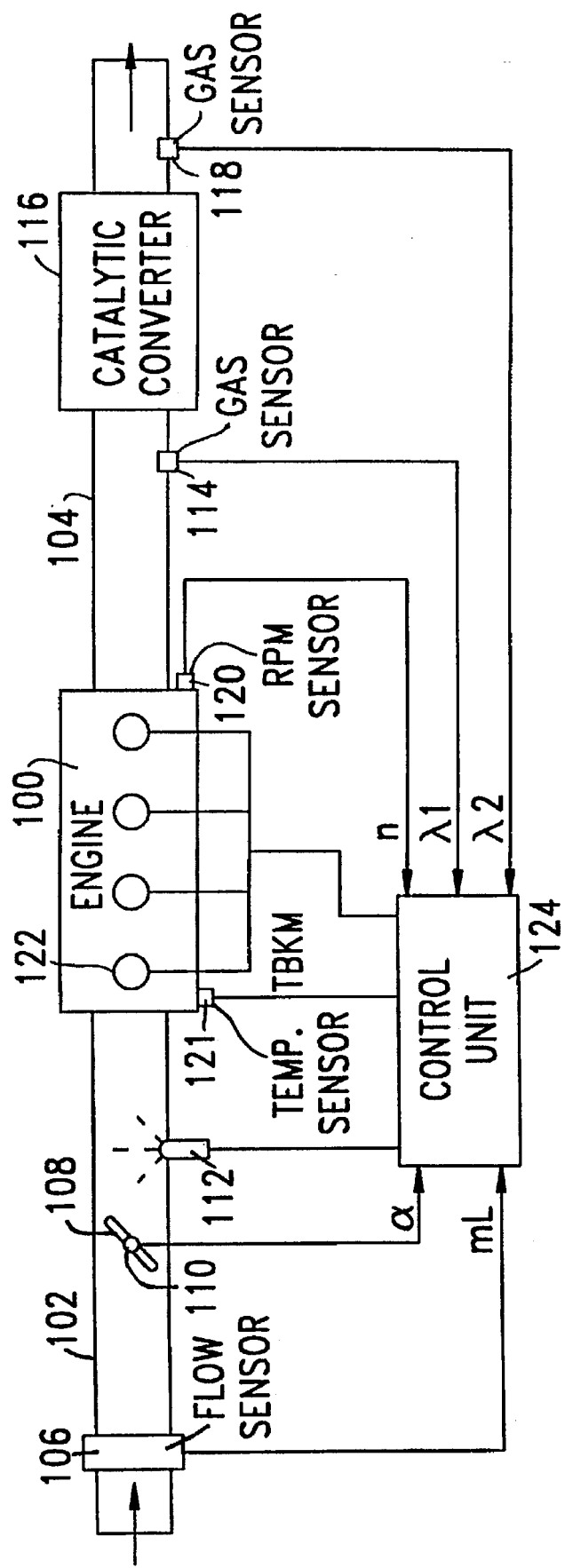
FIG. 1 shows an internal combustion engine and exhaust system in which the method and device according to the present invention can be used.

FIG. 1 shows an exemplary technical environment in which the method and device according to the present invention can be used. Air/fuel mixture is fed to an internal combustion engine 100 via an intake tract 102 and the exhaust gases are output into an exhaust gas channel 104. In the intake tract 102, there are, viewed in the direction of flow of the sucked-in air, an airflow rate sensor 106, for example a hot film airflow rate sensor, a throttle valve 108 with a sensor 110 for detecting the opening angle of the throttle valve 108, and one or more injection nozzles 112.

In the exhaust gas channel 104 there are, viewed in the direction of flow of the exhaust gas, a first exhaust gas sensor 114, a catalytic converter 116, and a second exhaust gas sensor 118. On the internal combustion engine 100 there are a speed of revolution sensor 120 and a temperature sensor 121. In addition, the internal combustion engine 100 has, for example, four spark plugs 122 for igniting the air/fuel mixture in the cylinders.

The output signals mL of the airflow rate sensor 106, the signal α of the sensor 110 for detecting the opening angle of the throttle valve 108, the signal λ1 of the first exhaust gas sensor 114, the signal λ2 of the second exhaust gas sensor 118, the signal n of the speed of revolution sensor 120 and the signal TBKM of the temperature sensor 121 are fed to a central control unit 124 via corresponding connecting lines. The control unit 124 evaluates the sensor signals and actuates the injection nozzle or injection nozzles 112 and the spark plugs 122 via further connecting lines.

Figure 2:
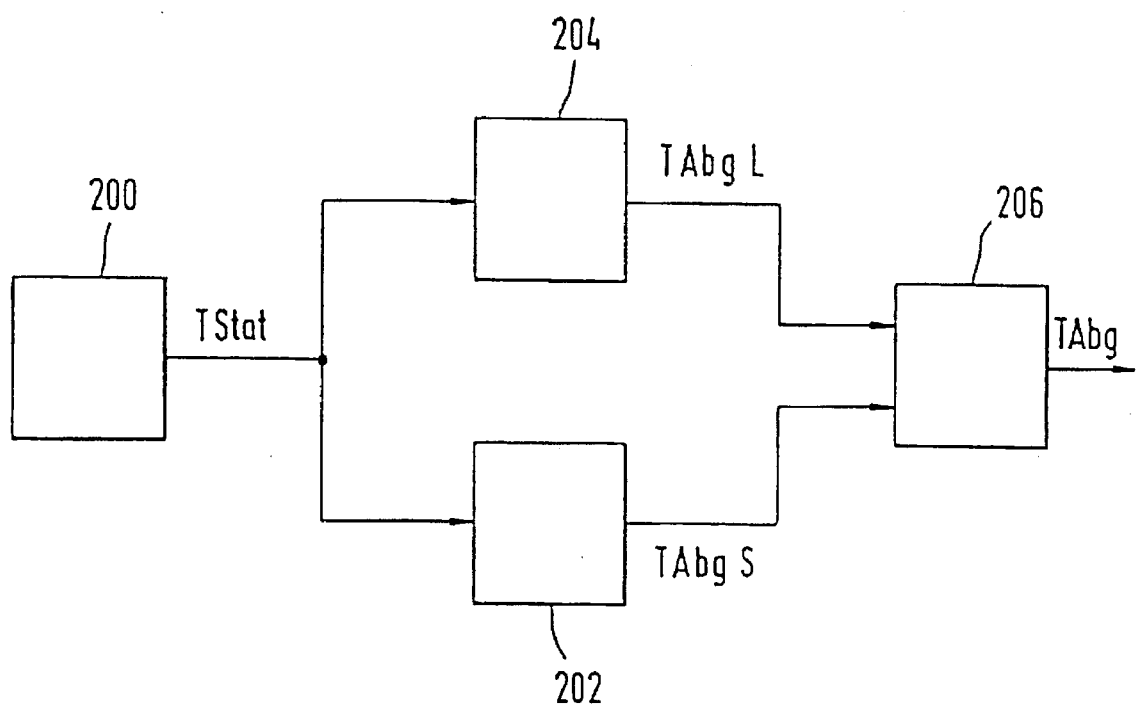
FIG. 2 shows a block diagram of a device according to the present invention.

FIG. 2 shows a block diagram of a device according to the present invention. A block 200 outputs a signal TStat for a steady state exhaust gas temperature. Details on the generation of this signal and on the input signals of the block 200 required for it are explained in FIG. 3 and the associated text. The steady state exhaust gas temperature is the exhaust gas temperature which is obtained when a given operating state of the internal combustion engine 100 has been maintained for a sufficiently long period, i.e. when a steady state operating state is present. However, in practice it is very frequently the case that the operating state of the internal combustion engine 100 changes, for example during acceleration, i.e. the internal combustion engine is frequently in non steady-state operating states. In these cases, the actual exhaust gas temperature usually differs from the steady-state exhaust gas temperature.

So that the most precise possible simulation of the actual exhaust gas temperature can be achieved even under non steady-state operating conditions, according to the present invention the generation of the signal TStat by means of the block 200 is followed by further processing steps. In order to carry out these further processing steps, the signal TStat is fed both into a block 202 and into a block 204. In the block 202, the influencing variables which affect the exhaust gas temperature quickly, i.e. without any appreciable delay, are taken into account. For example, the combustion process in the internal combustion engine during which the exhaust gases are produced quickly follows the changing operating conditions and also directly affects the exhaust gas temperature. In the block 204, the influencing variables which affect the exhaust gas temperature slowly, i.e. with a certain delay, are taken into account. These include, for example, the temperature of the exhaust gas channel 104 or other components which are in thermal contact with the exhaust gas.

The block 202 outputs a signal TAbgS, which represents a rapid portion of the exhaust gas temperature. The block 204 outputs a signal TAbgL, which represents a slow portion of the exhaust gas temperature. The signal TAbgS and the signal TAbgL are fed into one input each of a block 206. The block 206 serves to superimpose the two fed-in signals TAbgS and TAbgL to form (generate) a signal TAbg for the exhaust gas temperature. During this superimposition, the two signals TAbgS and TAbgL can be weighted differently. Details on this are illustrated in FIG. 3 and described in the associated text.

One aspect of the present invention includes the further processing of the signal TStat for the steady state exhaust gas temperature to form the signals TAbgS and TAbgL for the rapid and the slow portions of the exhaust gas temperature, and in superimposing the signals TAbgS and TAbgL with a prescribable weighting to form the signal TAbg for the exhaust gas temperature.

Figure 3:
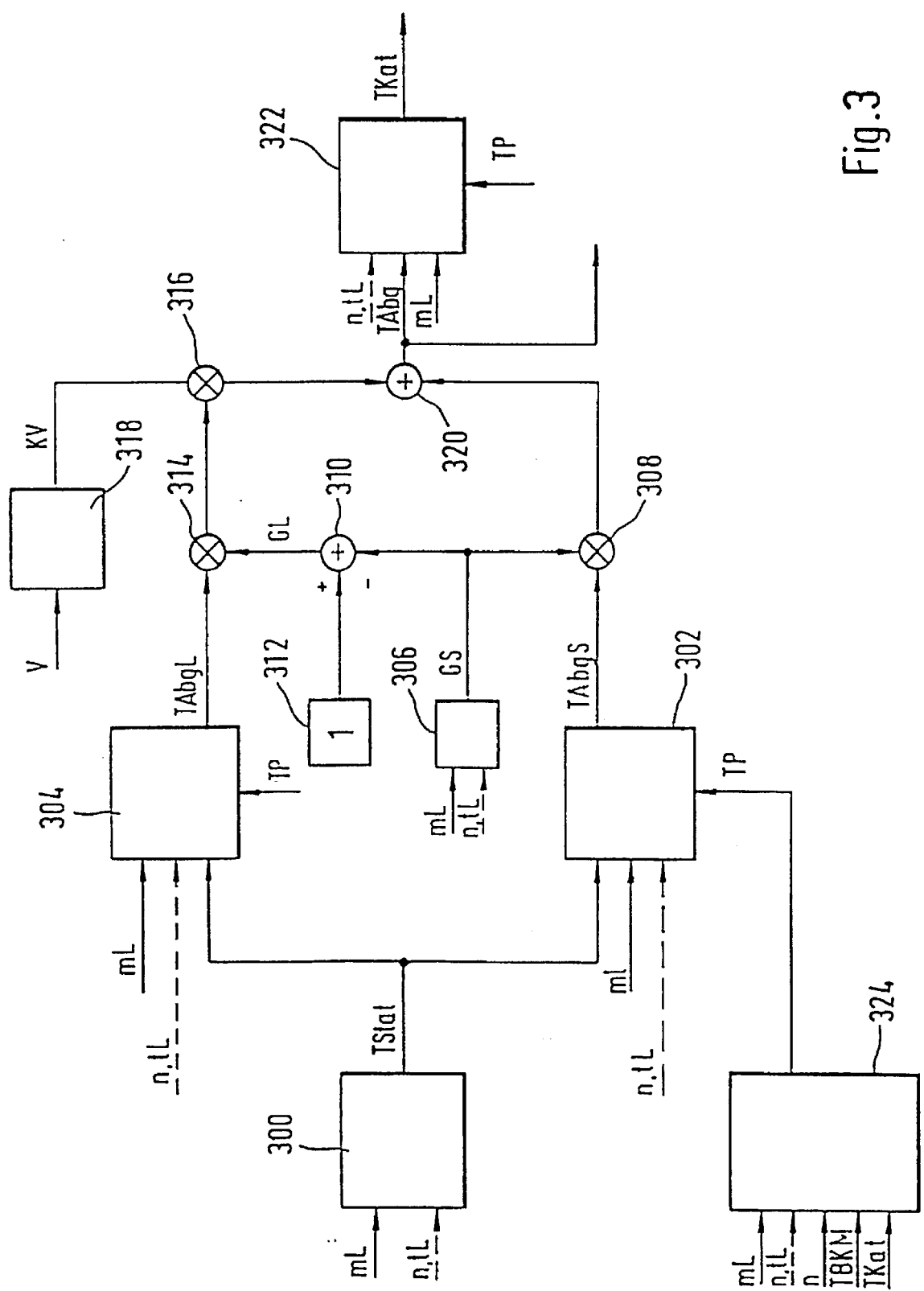
FIG. 3 shows a block circuit diagram of an exemplary embodiment according to the present invention.

FIG. 3 shows a block circuit diagram of an exemplary embodiment according to the present invention. The signal TStat for the steady state exhaust gas temperature is produced using a characteristic curve or a characteristic diagram 300. The characteristic curve or the characteristic diagram 300 corresponds to the block 200 from FIG. 2. A signal mL for the airflow rate, which signal is output by the airflow rate sensor 106, is fed into the input of the characteristic curve 300. In one variant according to the present invention, instead of the signal mL, a signal n for the speed of revolution and a signal tL for the load can be fed into the characteristic diagram 300. This variant is indicated by the broken line in FIG. 3. The alternative use of the signals mL or n and tL also is possible in other functional units in FIG. 3 which are described below. In principle, all signals which indicate the flow rate of gas through the internal combustion engine 100 are suitable as input signals for the characteristic curve or the characteristic diagram 300. This also applies to other functional units into which the signal mL is fed.

The output of the characteristic curve or of the characteristic diagram 300 is connected both to an input of a filter 302 and to an input of a filter 304, i.e. the signal TStat is fed both into the filter 302 and into the filter 304. The filter 302 corresponds to the block 202 in FIG. 2 and the filter 304 corresponds to the block 204. The filters 302 and 304 can be implemented, for example, as lowpass filters. The filters 302 and 304 have different timing constants which can additionally depend respectively on the signal mL which is fed into a second input of each of the filters. As is already the case in the characteristic diagram or the characteristic curve 300, the signal mL also can be replaced here by the signals n and tL.

The filter 302 provides at its output the signal TAbgS for the rapid portion of the exhaust gas temperature, i.e. the filter 302 has a rapid timing characteristic and thus a small filtering effect. This is achieved in an implementation as a lowpass filter by means of a small timing constant. Conversely, the filter 304 has a slow timing characteristic and thus a large filtering effect, which is achieved by means of a large timing constant in the case of a lowpass filter. The filter 304 provides at the output the signal TAbgL for the slow portion of the exhaust gas temperature.

Before the superimposition of the signals TAbgS and TAbgL, as mentioned already in the text relating to FIG. 2, the signals TAbgS and TAbgL also are provided with weighting factors GS and GL. The weighting factor GS is output by a characteristic curve or a characteristic diagram 306. The signal mL, or the signals n and tL, are fed into the characteristic curve or characteristic diagram 306. The weighting factor GS is fed to a logic connection point 308 and connected there to the signal TAbgS which is also fed to the logic connection point 308. In addition, the weighting factor GS is fed to a logic connection point 310 and subtracted there from the value 1 which is impressed on the logic connection point 310 by a ROM 312. In this way, the weighting factor GL is produced at the output of the logic connection point 310. The weighting factor GL is fed into a logic connection point 314 and logically connected there to the signal TAbgL which is fed to the logic connection point 314 by the filter 304.

The output of the logic connection point 314 is connected to a first input of a logic connection point 316, at whose second input a correction value KV, which is dependent on the speed of the vehicle, is present. The correction value KV is read out of a characteristic curve 318, at whose input the speed v of the vehicle is present. The correction value KV, which is dependent on the speed of the vehicle, is optional and thus need not be used.

The output of the logic connection point 316 is connected to a first input of a logic connection point 320 whose second input is connected to the output of the logic connection point 308. In the logic connection point 320, the superimposition of the signals TAbgS and TAbgL, which are weighted and may have been corrected as a function of the speed of the vehicle, takes place to form the signal TAbg for the exhaust gas temperature. The signal TAbg is provided at the output of the logic connection point 320 for functional blocks which require this signal as an input variable.

In addition, in the exemplary embodiment according to the present invention illustrated in FIG. 3, the signal TAbg is fed into a filter 322, which represents the dynamic characteristic of the catalytic converter 116, so that a signal TKat for the temperature of the catalytic converter can be tapped off at the output of the filter 322. The filter 322 can be implemented, for example, as a lowpass filter and have a timing constant which depends on the signal mL or on the signals n and tL.

Instead of the filter 322, or in addition to the filter 322, a functional block also may be present which, on the basis of the signal TAbg for the exhaust gas temperature or the signal TKat for the temperature of the catalytic converter 116, produces a signal for the temperature of the exhaust gas sensor 114 or the exhaust gas sensor 118. Generally, it is the case that the signal TAbg for the exhaust gas temperature can be used to determine further signals for temperatures in the exhaust system.

In addition, in FIG. 3, a dew point termination detector, which is already described in German Patent Application No. DE 43 38 342, is illustrated diagrammatically in the form of a block 324. The block 324 supplies a signal TP to the filters 302, 304 and 322 and by means of this signal causes the output signals of the filters to be limited to prescribable values as long as fluid can be expected in the region of the exhaust system which is assigned to the respective filter. Here, a different report relating to the presence of fluid can be transmitted to each of the three filters. The block 324 receives the signals mL, TBKM, n and TKat as input signals. The signal mL can in turn be replaced by the signals n and tL. Details relating to the processing of these signals are described in, for example, German Patent Application No. DE 43 38 342.

What is claimed is:

1. A method for generating a simulated signal representing a temperature in an exhaust system of a motor vehicle internal combustion engine, comprising the steps of:

generating a first signal representing a steady-state exhaust gas temperature;

generating a second signal representing a rapid portion of the first signal;

generating a third signal representing a slow portion of the first signal; and superimposing the second signal and the third signal to generate a fourth signal representing the temperature in the exhaust system.

2. The method according to claim 1, further comprising the steps of, before the superimposing step:

weighting the second signal by at least one first predetermined weighting factor; and weighting the third signal by at least one second predetermined weighting factor.

3. The method according to claim 2, wherein the at least one first and second weighting factors are determined as a function of a flow rate of gas through the internal combustion engine.

4. The method according to claim 3, wherein the flow rate of gas through the internal combustion engine is determined as a function of one of a signal representative of an airflow rate into the internal combustion engine and a signal representative of a load in combination with a signal representative of a speed of revolution.

5. The method according to claim 1, wherein the step of generating the third signal includes generating the third signal as a function of a correction factor, the correction factor being determined as a function of a speed of the motor vehicle.

6. The method according to claim 1, wherein the step of generating the second signal includes filtering the first signal via a first filter, and the step of generating the third signal includes filtering the first signal via a second filter.

7. The method according to claim 6, wherein the first filter has a first filtering effect and the second filter has a second filtering effect, the first filtering effect being less than the second filtering effect.

8. The method according to claim 7, wherein the first and second filtering effects are determined as a function of a flow of gas through the internal combustion engine.

9. The method according to claim 6, wherein the first filter includes a first low-pass filter having a first timing constant, and the second filter includes a second low-pass filter having a second timing constant, the first timing constant being less than the second timing constant.

10. The method according to claim 1, further comprising the step of generating at least one fifth signal representing a further temperature in the exhaust system, the at least one fifth signal being determined as a function of the fourth signal.

11. A device for generating a simulated signal representing a temperature in an exhaust system of a motor vehicle internal combustion engine, comprising:

first means for generating a first signal representing a steady-state exhaust gas temperature;

second means, coupled to the first means, for generating a second signal representing a rapid portion of the first signal;

third means, coupled to the first means, for generating a third signal representing a slow portion of the first signal; and fourth means, coupled to the second and third means, for superimposing the second signal and the third signal to generate a fourth signal representing the temperature in the exhaust system.

* * * * *